(12) United States Patent
Huang et al.

(10) Patent No.: US 8,687,718 B2
(45) Date of Patent: Apr. 1, 2014

(54) MULTIPLE-INPUT MULTIPLE-OUTPUT OFDM SYSTEMS

(75) Inventors: Xiaojing Huang, North Ryde (AU); Yingjie Jay Guo, Epping (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 378 days.

(21) Appl. No.: 12/746,906

(22) PCT Filed: Jul. 7, 2009

(86) PCT No.: PCT/AU2009/000882
§ 371 (c)(1),
(2), (4) Date: Feb. 2, 2011

(87) PCT Pub. No.: WO2010/003183
PCT Pub. Date: Jan. 14, 2010

(65) Prior Publication Data
US 2011/0261898 A1    Oct. 27, 2011

(30) Foreign Application Priority Data
Jul. 7, 2008   (AU) ................................ 2008903477

(51) Int. Cl.
*H04L 27/28*   (2006.01)
(52) U.S. Cl.
USPC ........................................................ 375/260
(58) Field of Classification Search
USPC ........................................................ 375/260
See application file for complete search history.

(56) References Cited

U.S. PATENT DOCUMENTS

| | | |
|---|---|---|
| 6,493,399 B1 | 12/2002 | Xia et al. |
| 6,785,341 B2 | 8/2004 | Walton et al. |
| 6,928,047 B1 | 8/2005 | Xia |
| 7,130,580 B2 | 10/2006 | Alexiou et al. |
| 7,190,734 B2 | 3/2007 | Giannakis et al. |
| 7,197,082 B2 | 3/2007 | Alexiou et al. |
| 7,197,084 B2 | 3/2007 | Ketchum et al. |
| 7,216,267 B2 | 5/2007 | Santraine et al. |
| 7,218,689 B2 | 5/2007 | Gupta |

(Continued)

FOREIGN PATENT DOCUMENTS

| | | |
|---|---|---|
| WO | WO 02/078211 A2 | 10/2002 |
| WO | WO 2007/052941 A1 | 5/2007 |

OTHER PUBLICATIONS

A. Alexiou, et al., "Reconfigurable MIMO transceivers for next-generation wireless systems", Bell Labs Technical Journal, Future Wireless Communications issue, vol. 10, No. 2, pp. 139-156 (Jul. 2005).

(Continued)

*Primary Examiner* — Kevin Kim
(74) *Attorney, Agent, or Firm* — Kilpatrick Townsend & Stockton LLP

(57) ABSTRACT

Disclosed is a method of processing a series of data bits for transmission on a transmit link, the method comprising mapping the series of data bits to a series of data symbols; demultiplexing the series of data symbols to a plurality of substreams of symbols; modulating each substream of symbols to a corresponding series of OFDM symbols; and space precoding the plurality of series of OFDM symbols to form one or more series of space precoded OFDM symbols, wherein the demultiplexing is dependent on channel state information for the transmit link.

15 Claims, 10 Drawing Sheets

(56) References Cited

U.S. PATENT DOCUMENTS

| | | | |
|---|---|---|---|
| 7,242,724 | B2 | 7/2007 | Alexiou et al. |
| 7,272,294 | B2 | 9/2007 | Zhou et al. |
| 7,280,604 | B2 | 10/2007 | Giannakis et al. |
| 2004/0125880 | A1* | 7/2004 | Emami et al. ............... 375/260 |
| 2005/0101259 | A1 | 5/2005 | Tong et al. |
| 2005/0185575 | A1* | 8/2005 | Hansen et al. ............... 370/208 |
| 2006/0093067 | A1* | 5/2006 | Jalali et al. .................. 375/299 |
| 2007/0011550 | A1* | 1/2007 | Agrawal et al. .............. 714/746 |
| 2007/0258352 | A1* | 11/2007 | Wang et al. .................. 370/203 |
| 2008/0104283 | A1* | 5/2008 | Shin et al. ....................... 710/6 |
| 2008/0212657 | A1* | 9/2008 | Bjerke et al. ................. 375/150 |

OTHER PUBLICATIONS

H. Sampath, et al., "Linear precoding for space-time coded systems with known fading correlations," IEEE Communications Letters, pp. 239-241 (Jun. 2002).

A. Medles, et al., "Linear precoding for STBC to account for antenna correlation in next generation broadband systems", 16th Annual IEEE International Symposium on Personal Indoor and Mobile Radio Communications, Berlin, Germany, (Sep. 2005).

A. Alexiou, et al., "Re-configurable linear precoders to compensate for antenna correlation in orthogonal and quasi-orthogonal space-time block coded systems," VTC (2004).

E. Yoon, et al., "Space-frequency pre-coding for an OFDM based system exploiting spatial and path correlation," in Proceedings of IEEE Global Telecommunications Conference, vol. 1, Dallas, TX, pp. 436-440 (Nov. 2004).

E. Yoon, et al., "Space-frequency precoding with space-tap correlation information at the transmitter," IEEE Transactions on Communications, vol. 55, No. 9, pp. 1702-1711 (Sep. 2007).

A. Gorokhov, et al., "Receive antenna selection for MIMO spatial multiplexing: theory and algorithms," IEEE Transactions on Signal Processing, vol. 51, No. 11, pp. 2796-2807 (Nov. 2003).

D. Gore, et al., "MIMO antenna subset selection for space-time coding," IEEE Transactions on Signal Processing, vol. 50, pp. 2580-2588 (Oct. 2002).

A. Gorokhov, "Antenna selection algorithms for MEA transmission systems," IEEE International Conference on Acoustical, Speech and Signal Processing, vol. 3, pp. 2857-2860 (2002).

S. Sanayei, et al., "Antenna selection in MIMO systems," IEEE Communications Magazine, vol. 42, No. 10, pp. 68-73 (Oct. 2004).

A. F. Molisch, et al., "MIMO systems with antenna selection," IEEE Microwave Magazine, vol. 5, No. 1, pp. 46-56 (Mar. 2004).

R. W. Heath, Jr., et al., "Antenna selection for spatial multiplexing with linear receivers," IEEE Communications Letters, vol. 5, No. 4, pp. 142-144 (Apr. 2001).

D. Gore, et al., "Transmit selection in spatial multiplexing systems," IEEE Communications Letters, vol. 6, No. 11, pp. 491-493 (Nov. 2002).

R. W. Heath, Jr., et al., "Multimode antenna selection for spatial multiplexing systems with linear receivers," IEEE Transactions on Signal Processing, vol. 53, No. 8, pp. 3042-3056 (Aug. 2005).

A. Dua, et al., "Receive antenna selection in MIMO systems using convex optimization," IEEE Transactions on Wireless Communications, vol. 5, No. 9, pp. 2353-2357. (Sep. 2006).

R. U. Nabar, et al., "Performance of multiantenna signaling techniques in the presence of polarization diversity," IEEE Transactions on Signal Processing, vol. 50, No. 10, pp. 2553-2562 (Oct. 2002).

L. Zheng, et al., "Diversity and multiplexing: A fundamental tradeoff in multiple antenna channels," IEEE Transactions on Information Theory, vol. 49, No. 5, pp. 1073-1096 (May 2003).

B. Varadarajan, et al., "The rate-diversity trade-off for linear space-time codes," in Proceedings of IEEE Vehicular Technology Conference, vol. 1, pp. 67-71 (2002).

M. Godavarti, et al., "Diversity and degrees of freedom in wireless communications," in Proceedings of ICASSP, vol. 3, pp. 2861-2854 (May 2002).

R. W. Heath, Jr., et al., "Switching between diversity and multiplexing in MIMO systems," IEEE Transactions on Communications, vol. 53, No. 6, pp. 962-968 (Jun. 2005).

J. W. Demmel, "The probability that a numerical analysis problem is difficult," Math. Comput., pp. 449-480, (1988).

M. R. McKay, et al., "Multiplexing/beamforming switching for coded Mimo in spatially correlated channels based on closed-form BER approximations," IEEE Transactions on Vehicular Technology, vol. 56, No. 5, pp. 2555-2567 (Sep. 2007).

R. Bhagavatula, et al., "Impact of mutual coupling and antenna efficiencies on adaptive switching between MIMO transmission strategies," IEEE 66th Vehicular Technology Conference, VTC-2007 Fall, pp. 749-753 (Sep. 30-Oct. 3, 2007).

\* cited by examiner

MULTIPLE-INPUT MULTIPLE-OUTPUT OFDM SYSTEMS

FIELD OF THE INVENTION

The present invention relates generally to wireless communication and, in particular, to multiple-input multiple-output communication systems using orthogonal frequency division multiplexing schemes.

BACKGROUND

Orthogonal frequency division multiplexing (OFDM) is a scheme for communicating digital data over a wireless channel. OFDM effectively mitigates the intersymbol interference (ISI) caused by channel time spread and only utilises simple frequency domain channel equalization. Due to these advantages, OFDM has been widely used in wireless personal, local, and metropolitan area networks (WPANs, WLANs, and WMANs) and digital audio and video broadcasting services (DAB/DVB). OFDM is also the strongest candidate scheme for future generation wireless mobile communication systems.

Multiple-input multiple-output (MIMO) techniques use multiple antennas at the transmitter and/or receiver ends of a wireless communication link to increase the system spectral efficiency and/or enhance the received radio signal quality. MIMO systems can operate in different transmission modes, such as spatial diversity, spatial multiplexing, and beamforming, depending on the signal correlations among antenna elements.

Spatial diversity refers to the use of multiple antennas to improve the link quality between the transmitter and the receiver. If the antenna elements are spaced sufficiently apart (or configured by some other means such as changing polarization and radiation patterns) so that uncorrelated signal paths can be formed, the link quality parameters such as the signal-to-noise ratio (SNR) can be improved by advanced signal processing algorithms implemented at the transmitter and/or the receiver end. Spatial multiplexing exploits the scattering properties of the wireless MIMO channels by transmitting multiple data streams, called substreams, in parallel on multiple antennas to increase link capacity. Like spatial diversity, spatial multiplexing requires uncorrelated MIMO channels, as well as high SNR. Beamforming allows spatial access to the radio channel by means of focusing the energy into some desired directions and nulling the others, leading to an increase of the average SNR. In beamforming mode, the MIMO channel structure and scattering properties are not exploited to define uncorrelated channels, but to obtain an equivalent single channel with improved properties.

Each of the above MIMO modes relies on a certain amount of available channel state information (CSI) at the transmitter and/or the receiver end. The CSI can be made available at the transmitter through feedback from the receiver or obtained based on estimation of the receive channel.

It is advantageous for a MIMO system to be able to adapt its parameters, signal processing algorithms or even physical antenna configuration according to different channel conditions and system requirements. Existing adaptive MIMO systems utilise linear precoding, antenna selection, or switching between MIMO transmission modes.

Linear precoding, commonly combined with space-time coding (transmitting a data symbol across different transmit antennas and time slots to enable the data symbol to experience different fading effects so that the received signal quality can be improved after diversity combining), is a technique by which the decoding complexity can be dramatically reduced. That is, joint maximum-likelihood (ML) decoding of the transmitted symbols can be decoupled into symbol-by-symbol decoding via linear precoding. An adaptive MIMO transmitter with linear precoding uses a linear filter (implemented via matrix multiplication) designed by making use of information about the channel conditions and/or propagation properties. The design of the linear filter can be based on a selected performance criterion. The main advantage of the linear precoding approach is that it does not have to track fast fading but only the slowly varying antenna correlations, which can be obtained from a low-rate feedback link or can be derived based on channel estimation using the reciprocity principle.

Antenna selection uses only a subset of the available transmit and/or receive antenna elements to reduce the system complexity and cost, while meeting some specified performance criteria. There are two kinds of antenna selection techniques. One is deterministic antenna selection, by which different sets of antenna elements are selected according to the instantaneous channel state, and the optimal set is determined every time the channel changes. The other is statistical antenna selection, which is based on second-order channel statistics, when spatial multiplexing or space-time coding techniques are used over the wireless link.

MIMO transmission mode switching between spatial multiplexing and spatial diversity achieves a trade-off between data rate and reliability under different antenna correlations. The switching can be based on the instantaneous channel state, which requires a low-rate feedback channel from the receiver to the transmitter. In order to maximize system throughput, it is also possible to switch between spatial multiplexing in low element correlation conditions and beamforming in high element correlation conditions. Mode switching requires minimal feedback information since it relies on only two channel statistics, the average SNR and the spatial correlation between antennas.

In a MIMO system, signals are transmitted not only through different links among transmit and receive antenna elements but also through multiple paths with different time delays. The multipath transmission will lead to frequency-selective fading in OFDM systems, which worsens system performance.

SUMMARY

It is an object of the present invention to substantially overcome, or at least ameliorate, one or more disadvantages of existing arrangements.

According to a first aspect of the present disclosure, there is provided a method of processing a series of data bits for transmission on a transmit link, comprising:

mapping said series of data bits to a series of data symbols;

demultiplexing said series of data symbols to a plurality of substreams of symbols;

modulating each said substream of symbols to a corresponding series of OFDM symbols; and space precoding said plurality of series of OFDM symbols to form one or more series of space precoded OFDM symbols, wherein said demultiplexing is dependent on channel state information for said transmit link.

According to a second aspect of the present disclosure, there is provided a method of processing one or more series of OFDM symbols, comprising:

demodulating each said series of OFDM symbols to a corresponding series of space and frequency precoded data symbols;

equalising said one or more series of space and frequency precoded data symbols to form one or more substreams of frequency precoded data symbols;

frequency decoding each said substream of frequency precoded data symbols to a series of data symbols; and de-mapping said one or more series of data symbols to a series of data bits.

According to another aspect of the present disclosure, there is provided a device adapted to implement each of the aforementioned methods.

According to another aspect of the present disclosure, there is provided a multiple-input multiple-output OFDM communication system adapted to communicate data as OFDM symbols over a transmit link, wherein the number of substreams of OFDM symbols is varied dependent on channel state information for said transmit link.

Disclosed are arrangements for multi-mode MIMO systems with adaptive substream selection through space precoding. The disclosed arrangements also exploit the frequency diversity inherent in a frequency-selective multipath fading channel by employing frequency precoding with the orthogonal frequency division multiplexing (OFDM) and orthogonal division frequency multiple access (OFDMA) techniques. The MIMO systems according to the disclosed arrangements can operate in different transmission modes without explicitly switching between them. The disclosed space precoding with adaptive substream selection arrangements do not distinguish among these modes, but choose different numbers of substreams to adapt to changed channel conditions. When the transmit and receive antennas are less correlated, more substreams are used to increase the data rate. When the transmit and receive antennas are more correlated, fewer substreams are used to improve the signal quality in a substream.

Further, the disclosed arrangements use adaptive modulation, so that a high quality substream can be transmitted with higher data rate.

Combining space precoding and frequency precoding adds further diversity advantage in addition to spatial diversity and thus significantly improves the system performance in terms of throughput. The MIMO systems according to the disclosed arrangements are therefore practical and adaptive to varying channel conditions while delivering superior performance in terms of system throughput as explained above.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
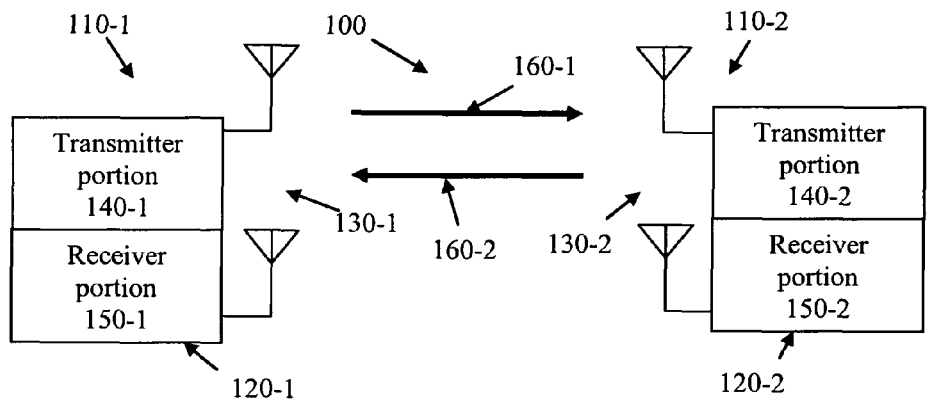
FIG. 1 illustrates a MIMO OFDM wireless communication system on which a first embodiment may be practised.

Where reference is made in any one or more of the accompanying drawings to steps and/or features, which have the same reference numerals, those steps and/or features have for the purposes of this description the same function(s) or operation(s), unless the contrary intention appears.

The disclosed adaptive substream selection scheme with both space and frequency precoding can be implemented in two systems. One is a MIMO OFDM system for peer-to-peer communications such as in wireless local area networks (WLANs) and wireless personal area networks (WPANs). The other is the MIMO OFDMA system for multiuser communications such as wireless cellular systems and broadband systems.

First Embodiment

FIG. 1 illustrates a peer-to-peer MIMO OFDM wireless communication system 100 comprising two nodes 110-1 and 110-2, on which a first embodiment may be practised. Each node 110-$i$ comprises a MIMO OFDM transceiver 120-$i$ and an antenna array 130-$i$. Each MIMO OFDM transceiver 120-$i$ comprises a transmitter portion 140-$i$ and a receiver portion 150-$i$. The number of antennas in the array 130-$i$ is denoted as $M_r$ when the antennas receive signals, while $M_t$ is used for the number of antennas when the antennas transmit signals. $M_t$ and $M_r$ are the same for any given transceiver, but different transceivers may have different numbers of antennas. The link 160-1 is the transmit link for node 110-1 and the feedback link for node 110-2, while the link 160-2 is the transmit link for node 110-2 and the feedback link for node 110-1.

Figure 2:
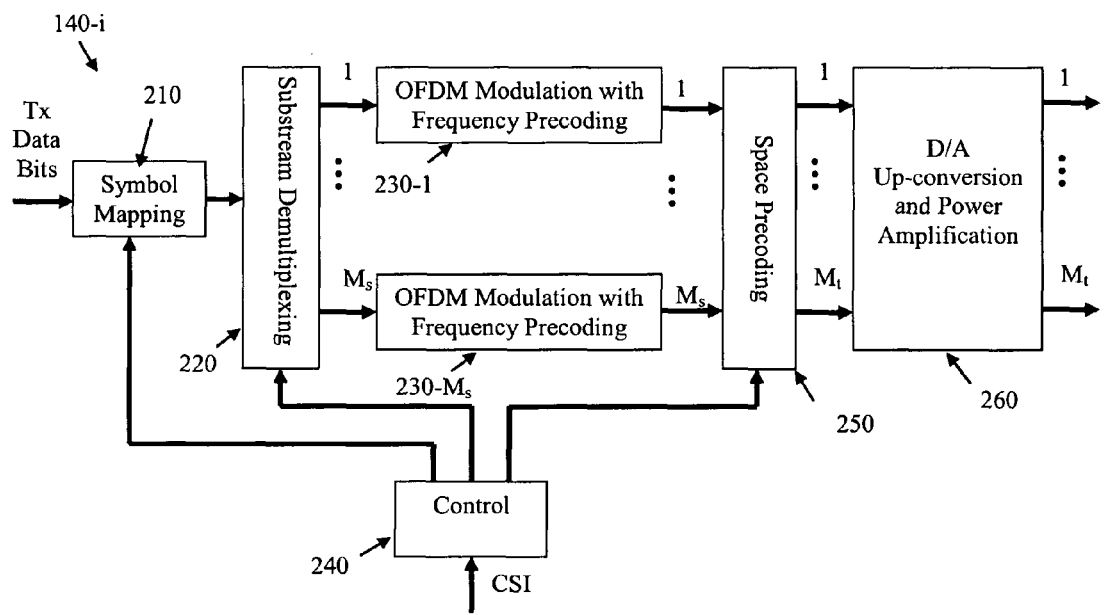
FIG. 2 illustrates the transmitter portion of each transceiver node in FIG. 1 according to the first embodiment.

FIG. 2 illustrates the transmitter portion 140-$i$ of each OFDM transceiver 120-$i$ of FIG. 1 according to the first embodiment. The transmitter portion 140-$i$ comprises a symbol mapping module 210, a substream demultiplexing module 220, $M_s$ OFDM modulation with frequency precoding modules 230-1 to 230-$M_s$, a space precoding module 250, and an RF module 260 performing digital-to-analogue conversion (D/A), up-conversion, and power amplification on its $M_t$ input signals, where $M_t$ is the number of antennas in the antenna array 130-*i*. The data bits to be transmitted, preferably including the CSI for the feedback link 160-(3-*i*), and preferably forward error coding (FEC) protected, are firstly mapped into data symbols via multi-level quadrature amplitude modulation (QAM) by the symbol mapping module 210. The data symbols are then divided into $M_s$ data substreams by the substream demultiplexing module 220. Each data substream is passed through an OFDM modulation with frequency precoding module 230-*j* to generate a time-domain sample sequence called a frequency precoded OFDM symbol. A vector of $M_s$ samples, each of which comes from one of the parallel OFDM symbols at the same time instant, is multiplied in the space precoding module 250 by an $M_t$ by $M_s$ matrix, to form a vector of $M_t$ samples. After space precoding for all samples in the $M_s$ OFDM symbols, $M_t$ signal streams are formed. Space precoding forms linear combinations of the OFDM symbols to optimise the use of multiple antennas. Finally, after D/A, up-conversion, and power amplification by the module 260, these $M_t$ signal streams are passed for transmission over link 160-*i* by the $M_t$ antennas in the antenna array 130-*i*. Since the CSI for the link 160-*i* is preferably extracted from the feedback link 160-(3-*i*) by the receiver portion 150-*i* (see below), the transmitter portion 140-*i* also includes a control module 240 implementing an adaptive algorithm, described in more detail below, to control the symbol mapping module 210, the substream demultiplexing module 220, and the space precoding module 250 to select the QAM level, the number $M_s$ of substreams, and the space precoding matrix used by the module 250, according to varying transmit channel conditions. The update frequency depends on the fading rate and the data frame/packet structure once the CSI is made available.

Figure 3:
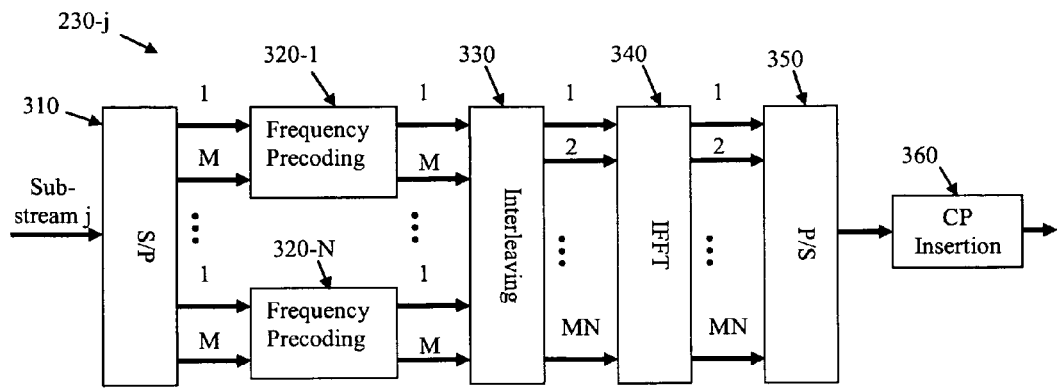
FIG. 3 illustrates each OFDM modulation with frequency precoding module in FIG. 2 in more detail.

Each OFDM modulation with frequency precoding module 230-*j* is illustrated in more detail in FIG. 3. The data symbols in the jth data substream are firstly grouped by a serial-to-parallel (S/P) conversion module 310 into N data sets, each of which is composed of M parallel data symbols. Each set of parallel data symbols is considered as an M by 1 vector which is further multiplied, in a corresponding frequency precoding module 320-*k*, by a matrix of dimensions M by M, which is the same for all modules 320-*k*, to form a new set of M parallel symbols. The function of the frequency precoding is to obtain different linear combinations of the input data symbols via matrix multiplications. After performing the frequency precoding for all the N data symbol sets, the resulting MN frequency precoded data symbols are interleaved by an interleaving module 330. Interleaving is used to modulate the M precoded data symbols in each set onto independent subcarriers. If no interleaving is used, the effect of precoding is reduced, since adjacent subcarriers are more likely correlated. The MN interleaved data symbols are then transformed into the time domain by an inverse fast Fourier transform (IFFT) module 340 to produce MN time-domain samples. After parallel-to-serial conversion (P/S) by the module 350 and cyclic prefix (CP) insertion by the module 360, a frequency precoded OFDM symbol representing MN consecutive data symbols in substream j is formed.

Figure 4:
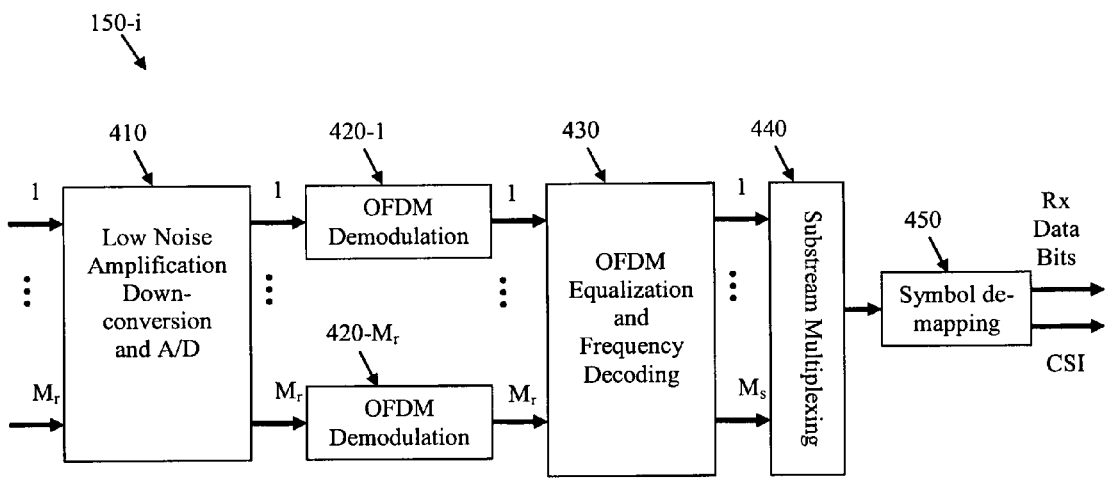
FIG. 4 illustrates the receiver portion of each transceiver node in FIG. 1 according to the first embodiment.

FIG. 4 illustrates the receiver portion 150-*i* of each OFDM transceiver 120-*i* of FIG. 1 in more detail according to the first embodiment. The receiver portion 150-*i* comprises an RF module 410, $M_r$ OFDM demodulation modules 420-1 to 420-$M_r$, an OFDM equalization and frequency decoding module 430, a substream multiplexing module 440, and a symbol de-mapping module 450. The $M_r$ received RF signals from $M_r$ antennas in the antenna array 130-*i* are converted into digital baseband through the RF module 410 which performs low noise amplification, down-conversion, and analogue-to-digital (A/D) conversion, and produces $M_r$ parallel received OFDM symbols. Each OFDM demodulation module 420-*j* converts a corresponding received OFDM symbol into the frequency domain, and the OFDM equalization and frequency decoding module 430 removes the MIMO and frequency-selective multipath fading channel effects and recovers the data symbols into $M_s$ data substreams. Finally, after substream multiplexing by multiplexing module 440, the $M_s$ data substreams form one stream of data symbols and are de-mapped into received data bits by the symbol de-mapping module 450. Since the CSI for the transmit link 160-*i* is preferably embedded in the received data bits, the CSI for the transmit link 160-*i* is also preferably extracted by the symbol de-mapping module 450. The receiver portion 150-*i* also estimates the CSI for the feedback link 160-(3-*i*) using conventional channel estimation techniques.

Figure 5:
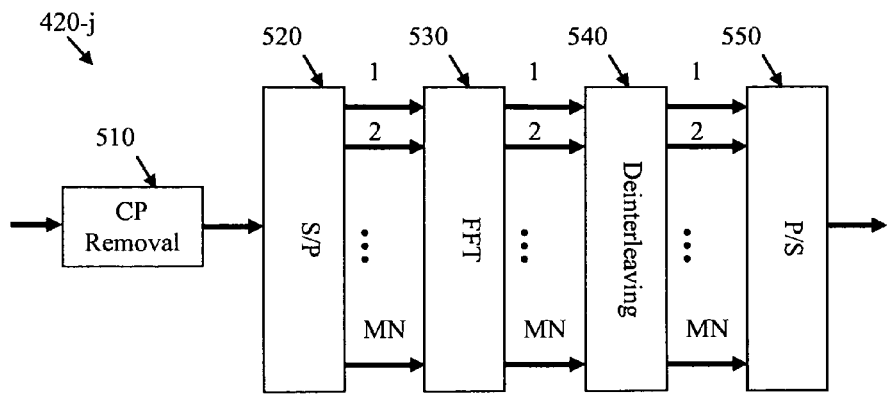
FIG. 5 illustrates each OFDM demodulation module in FIG. 4 in more detail.

Each OFDM demodulation module 420-*j* is illustrated in more detail in FIG. 5. The CP inserted by the module 360 is firstly removed from the received OFDM symbol of the jth received signal by the CP removal module 510. Then, the CP removed OFDM symbol is converted into MN parallel time-domain samples via the S/P module 520. After fast Fourier transformation (FFT) and deinterleaving by the modules 530 and 540 respectively, MN data symbols in frequency domain are produced. These data symbols are finally output in series via the P/S module 550.

Figure 6:
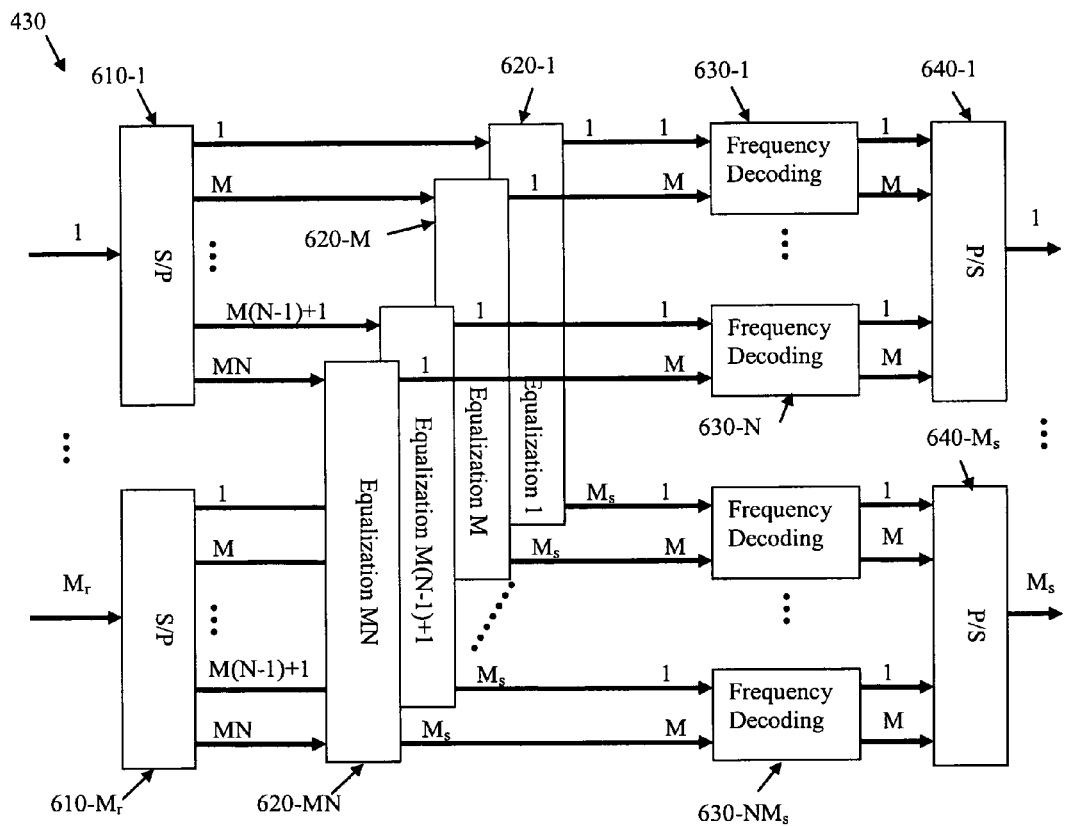
FIG. 6 illustrates the OFDM equalization and frequency decoding module in FIG. 4 in more detail.

The OFDM equalization and frequency decoding module 430 is illustrated in more detail in FIG. 6. The demodulated data symbols from all $M_r$ modules 420-*j* are converted into MN parallel subchannels by the S/P modules 610-1 to 610-$M_r$. Note that the modules 550 are redundant with the modules 610-*j*, so both could be removed without affecting the functionality. Each set of $M_r$ symbols from the MN subchannels can be considered as a vector of dimension $M_r$ by 1. There are MN such sets of $M_r$ symbols, and hence MN vectors of dimension $M_r$ by 1. Each such vector is multiplied in an equalization module 620-*k* by a matrix of dimension $M_s$ by $M_r$, which is called the equalization matrix, to form $M_s$ equalized data symbols. The equalization matrices depend on the space precoding matrix used in the module 250, the channel characteristics, and the equalization technique to be used, in the conventional manner. There are MN such equalization modules 620-*k*, producing MN sets of $M_s$ equalized data symbols. The $M_s$ equalized data symbols from the MN equalized data symbol sets are further divided into $NM_s$ groups, each of which has M data symbols. Each group of M data symbols is passed through a frequency decoding module 630-*k* (implementing a multiplication by a constant M by M matrix) to produce M decoded data symbols. N groups of decoded data symbols form each substream of decoded data symbols after a P/S module 640-*j*. The module 430 therefore produces $M_s$ substreams of decoded data symbols.

Figure 7:
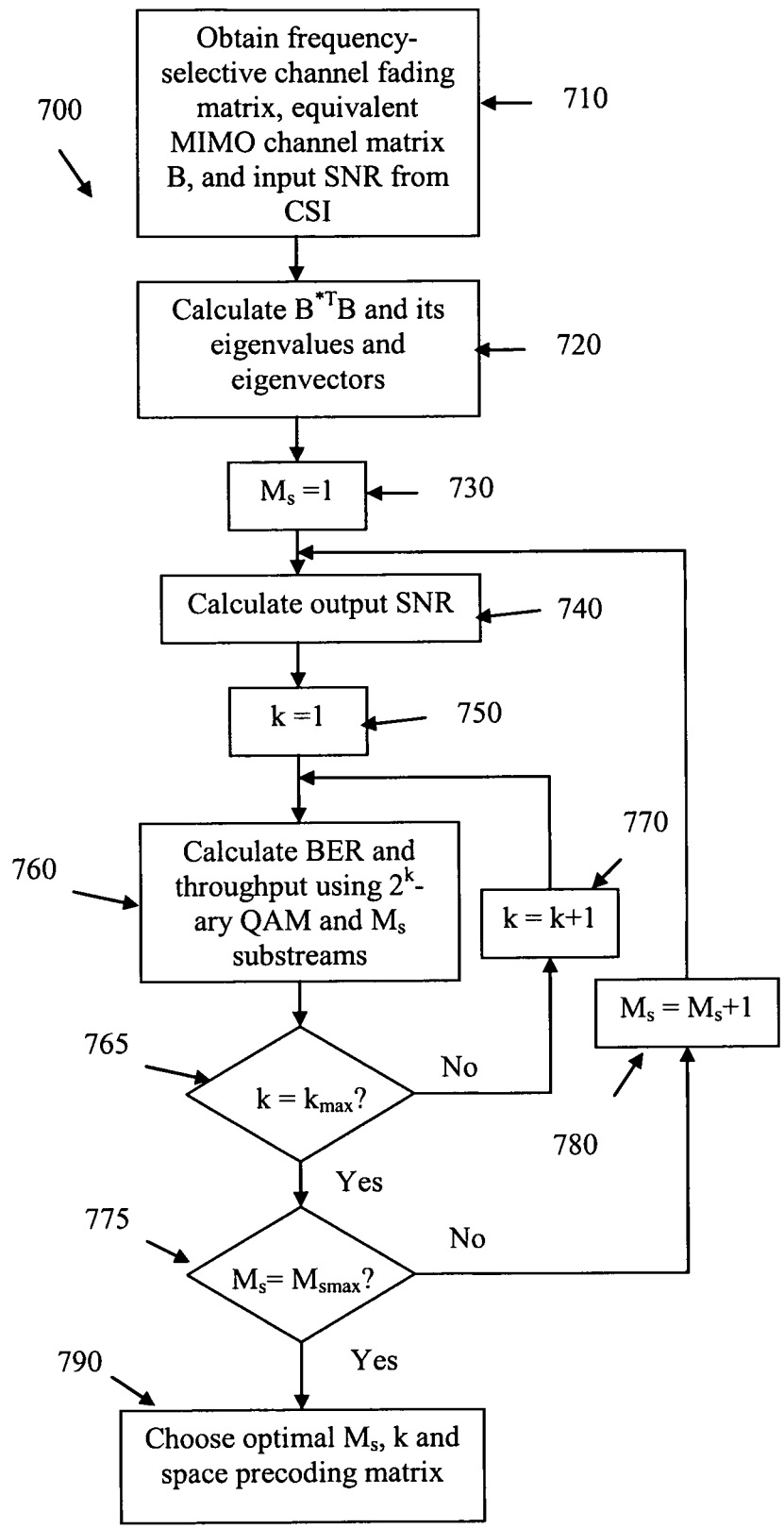
FIG. 7 is a flow diagram illustrating an adaptive algorithm carried out by the control module in FIG. 2 according to the first embodiment.

As previously mentioned when describing the MIMO OFDM transmitter portion 140-*i*, the QAM level of data mapping by module 210, the number $M_s$ of data substreams, and the space precoding matrix used by module 250 are determined by the control module 240 using an adaptive algorithm once the CSI for the transmit link 160-*i* is available via the feedback link 160-(3-*i*). FIG. 7 is a flow diagram illustrating such an adaptive algorithm 700 according to the first embodiment.

The method 700 begins at step 710, where the control module 240 obtains the frequency-selective channel fading matrix, the equivalent MIMO channel matrix B, and the input signal-to-noise ratio (SNR) from the CSI for the transmit link 160-*i*. Next at step 720, the control module 240 calculates the product $B^{*T}B$ of B with its conjugate transpose, and the eigenvalues and eigenvectors of the product. The following step 730 initialises the value of $M_s$ to 1, after which step 740 calculates the output SNR as follows:

$$\gamma = \frac{M_s N}{\sum_{n=0}^{N-1} \text{trace}\{(\gamma_{in}|a_n|^2 B^{*T}B + I_{M_s})^{-1}\}} - 1$$

where $\gamma_{in}$ is the input SNR and $\alpha_n$ is the frequency-selective channel fading coefficient at subcarrier n. The method 700 proceeds to step 750 at which a variable k is initialised to one, after which the control module at step 760 calculates the bit error rate (BER) and the throughput for a MIMO system using $2^k$-ary QAM in $M_s$ substreams as follows:

$$BER = \frac{4}{k}\left(1 - 2^{-\frac{k}{2}}\right)Q\left(\sqrt{\frac{3}{2^k - 1}\gamma}\right),$$

$$\text{throughput} = k(1 - BER)^S$$

where S is the number of data bits in a packet. Step 765 tests whether k equals the maximum number $k_{max}$ of QAM levels. If not, the method 700 increments k at step 770 and returns to step 760 to recalculate the bit error rate (BER) and the throughput for the new value of k. Once k reaches its maximum value $k_{max}$, the method 700 proceeds to step 775 which determines whether $M_s$ equals its maximum value $M_{smax}$, being the maximum of the number $M_t$ of transmit antennas and the number $M_r$ of receive antennas for the node 110-$i$. If not, the method 700 increments $M_s$ at step 780 and returns to step 740 described above. Once $M_s$ reaches its maximum value $M_{smax}$, the control module at step 790 chooses the values of $M_s$ and k which correspond to the maximum throughput, and then computes the space precoding matrix from the eigenvectors corresponding to the first $M_s$ maximum eigenvalues of $B^{*T}B$. The method 700 is then complete. The chosen $M_s$ and k values are preferably encoded in the header of a transmitted data packet, depending on the specific communication protocol in use.

Second Embodiment

Figure 8:
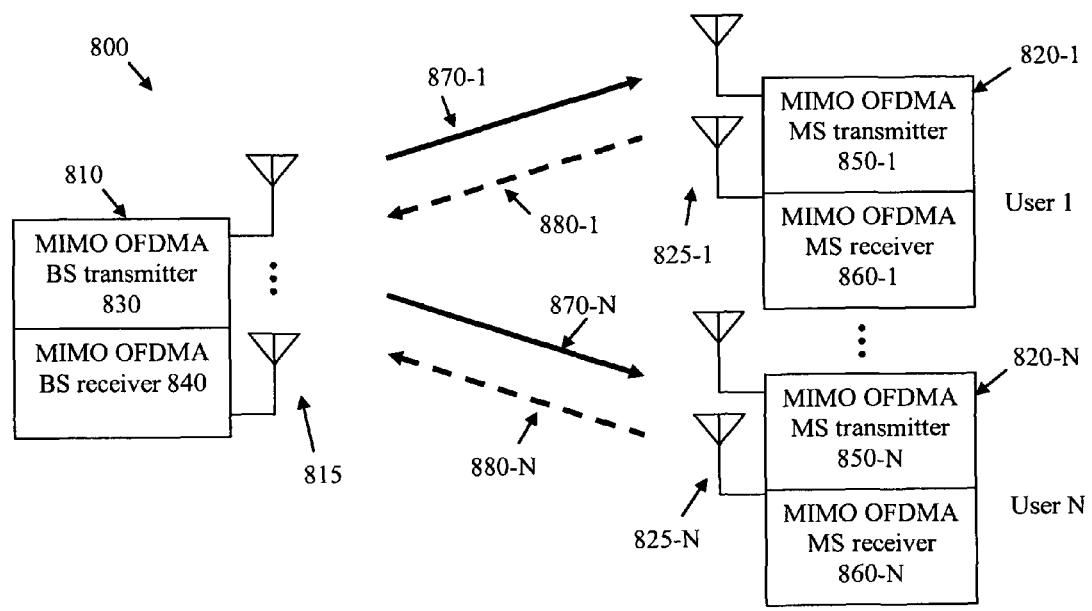
FIG. 8 illustrates an MIMO OFDMA wireless communication system on which a second embodiment may be practised.

A MIMO OFDMA system 800 on which the second embodiment may be practised is illustrated in FIG. 8. The system 800 comprises one base station (BS) 810 and N mobile stations (MSs) 820-1 to 820-N, each serving a separate user. The transmission link 870-$i$ from the BS to the MS 820-$i$ is called the down-link while the transmission link 880-$i$ from the MS 820-$i$ to the BS is called the up-link. The BS 810 comprises a BS transmitter 830, a BS receiver 840, and an antenna array 815, while each MS 820-$i$ comprises a transmitter 850-$i$, a receiver 860-$i$, and an antenna array 825-$i$.

Figure 9:
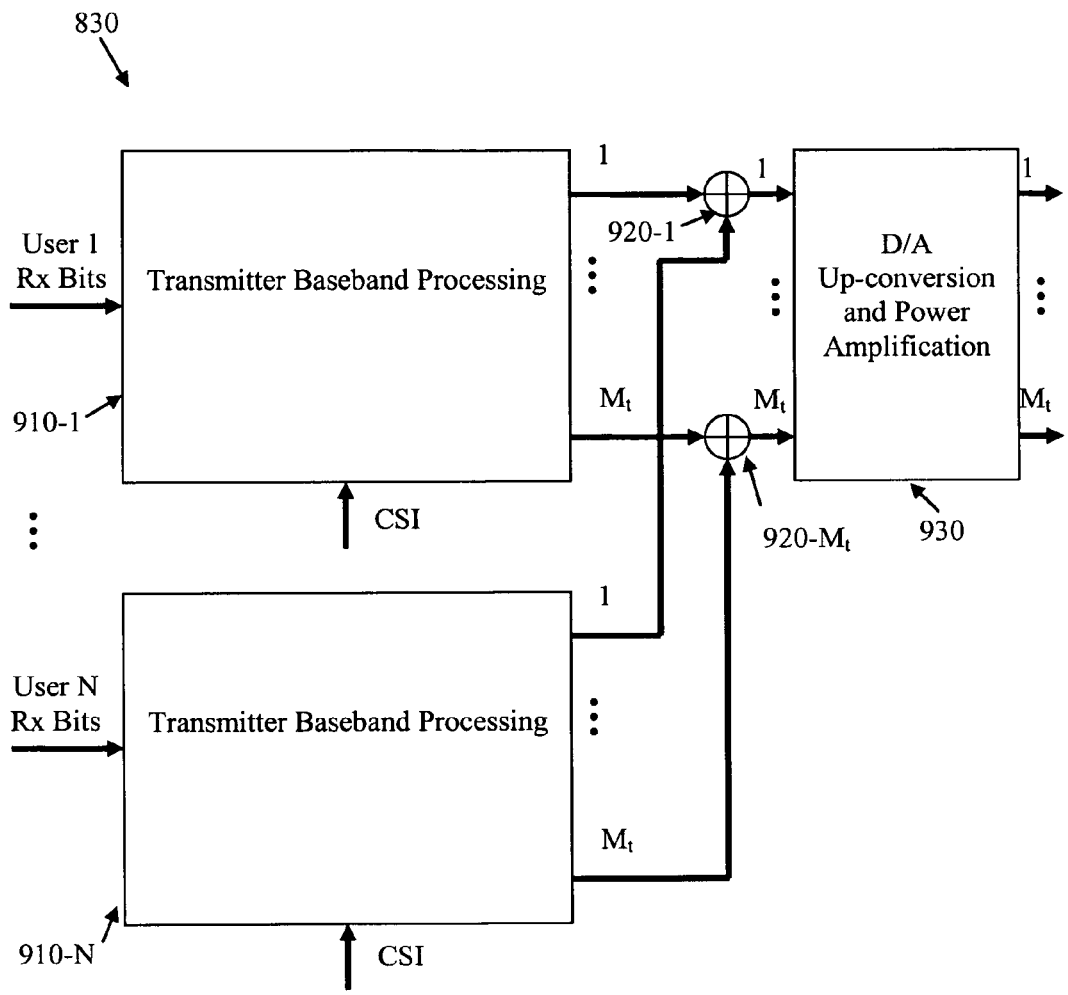
FIG. 9 illustrates the transmitter at the base station of FIG. 8 according to the second embodiment.

The transmitter 830 at the BS 810 according to the second embodiment is illustrated in FIG. 9. The transmitter 830 comprises N transmitter baseband processing modules 910-1 to 910-N, which process the respective bits to be received by the N users, preferably using the CSI for the corresponding down-links 870-$i$ received via the corresponding up-links 880-$i$, to form $M_t$ signal streams. Each of the $M_t$ signal streams are summed over the N users by the $M_t$ adders 920-1 to 920-$M_t$. After D/A conversion, up-conversion, and power amplification by the module 930, the $M_t$ combined signal streams are transmitted by the $M_t$ antennas in the antenna array 815.

Figure 10:
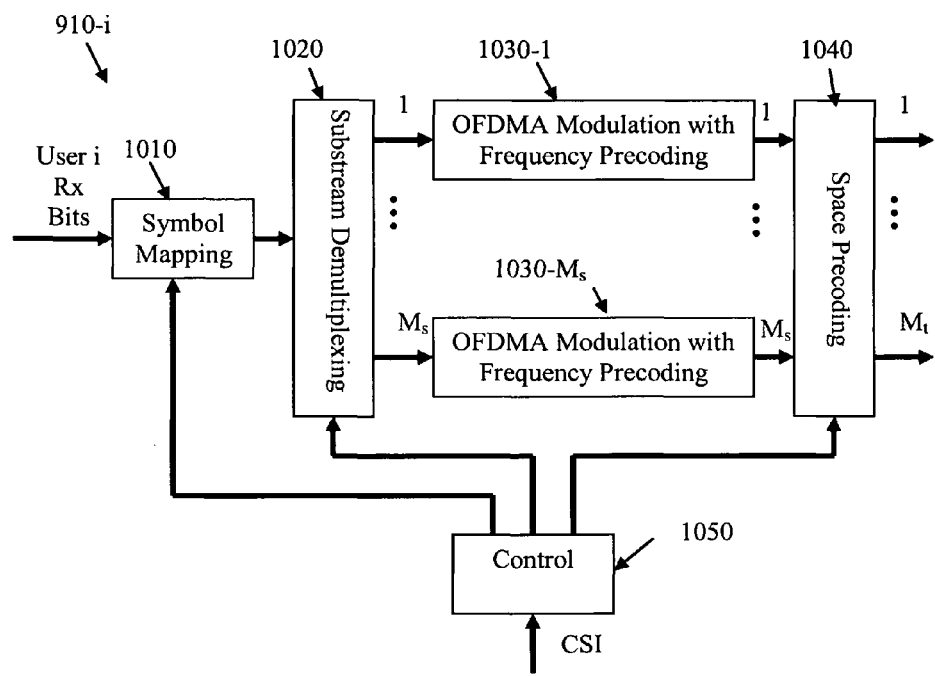
FIG. 10 illustrates the transmitter baseband processing module of FIG. 9 in more detail.

FIG. 10 illustrates the transmitter baseband processing module 910-$i$, corresponding to user i, in more detail. The transmitter baseband processing module 910-$i$ comprises a symbol mapping module 1010, a substream demultiplexing module 1020, $M_s$ OFDMA modulation with frequency precoding modules 1030-1 to 1030-$M_s$, and a space precoding module 1040. The bits to be received by user i, preferably including the CSI for the corresponding up-link 880-$i$, and preferably FEC protected, are firstly mapped into data symbols via multi-level QAM by the symbol mapping module 1010. The data symbols are then divided into $M_s$ data substreams by the substream demultiplexing module 1020. Each data substream is passed through an OFDMA modulation with frequency precoding module 1030-$j$ to generate a time-domain sample sequence called a frequency precoded OFDM symbol. A vector of $M_s$ samples, each of which comes from one of the parallel OFDM symbols at the same time instant, is multiplied in the space precoding module 1040 by an $M_t$ by $M_s$ matrix, to form a vector of $M_t$ samples. After space precoding for all samples in the $M_s$ OFDM symbols, $M_t$ signal streams are formed. Since the CSI for the down-link 870-$i$ to the corresponding user i is preferably available through the up-link 880-$i$ from that user, the transmitter baseband processing module 910-$i$ also includes a control module 1050 implementing an adaptive algorithm to control the symbol mapping module 1010, the substream demultiplexing module 1020, and the space precoding module 1040 to select the QAM level, the number $M_s$ of substreams, and the space precoding matrix used by the module 1040, according to varying conditions on the down-link 870-$i$ for the corresponding user i. The adaptive algorithm implemented by the control module 1050 is the same as the method 700 implemented by the control module 240 in the MIMO OFDM transmitter portion 140-$i$ of FIG. 2.

Figure 11:
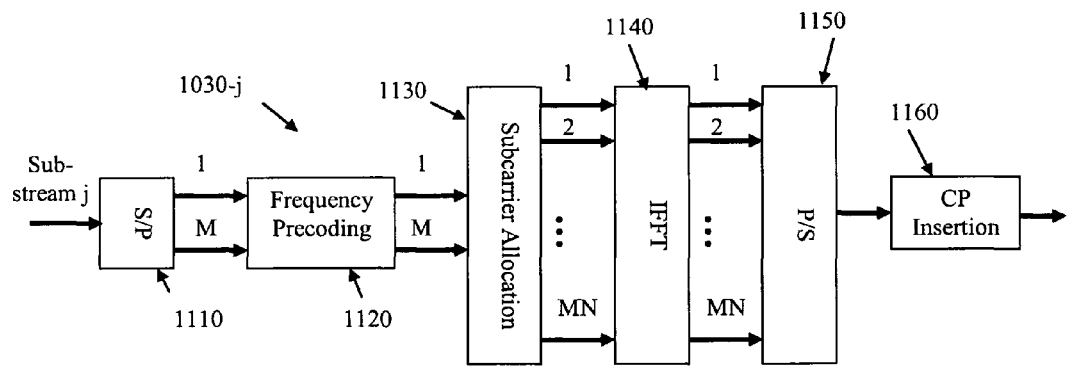
FIG. 11 illustrates each OFDMA modulation with frequency precoding module of FIG. 10 in more detail.

FIG. 11 illustrates an OFDMA modulation with frequency precoding module 1030-$j$, analogous to the module 230-$j$ in FIG. 4, in more detail. The data symbols in the jth data substream are firstly grouped by the S/P conversion module 1110 to form a set of M parallel data symbols. This data symbol set is frequency precoded in the module 1120 by multiplication by a fixed matrix of dimensions M by M, to form a precoded set of M parallel symbols. The M precoded symbols are then allocated to M different subcarriers among a total of MN subcarriers by the subcarrier allocation module 1130. The other subcarriers are filled with zeros. The $NM_s$ subcarrier allocation modules 1130 are coordinated among the N users such that each subcarrier is allocated to only one user. After an IFFT by the IFFT module 1140, MN time-domain samples are produced from MN precoded symbols. Finally, after P/S conversion by the P/S module 1150 and CP insertion by the module 1160, a frequency precoded OFDM symbol, representing M consecutive data symbols in the jth substream, is formed.

Figure 12:
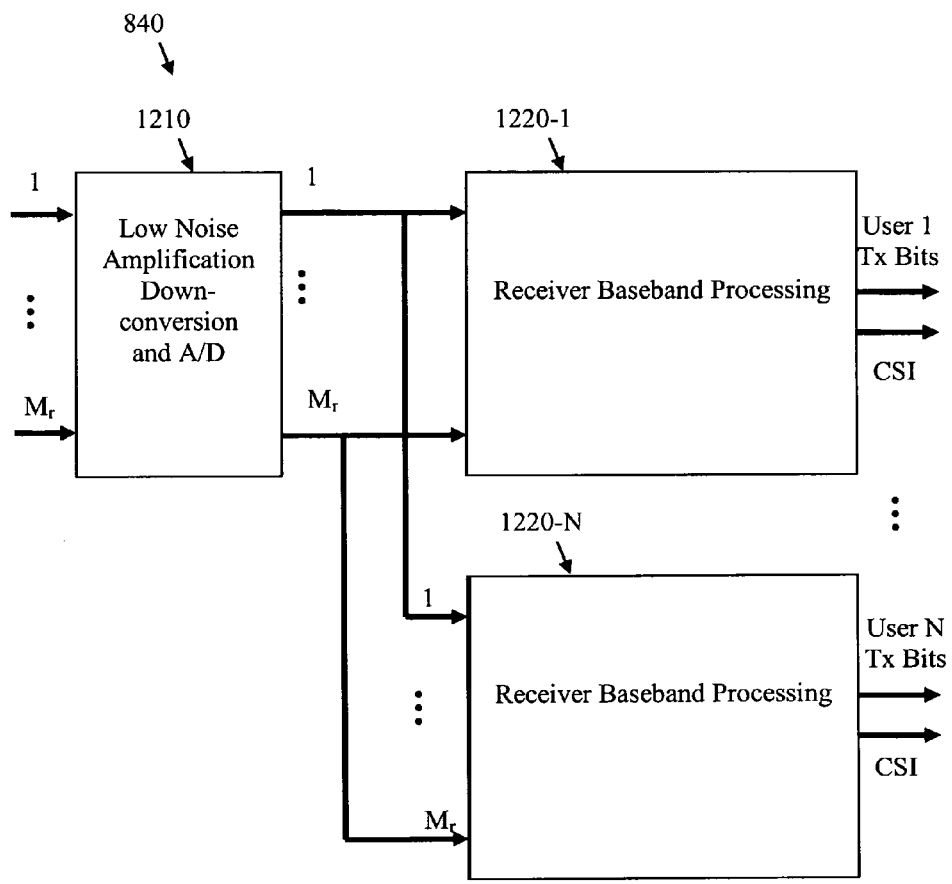
FIG. 12 illustrates the receiver at the base station of FIG. 8 according to the second embodiment.

The receiver 840 at the BS 810 according to the second embodiment is illustrated in FIG. 12. The receiver 840 comprises an RF module 1210 performing low noise amplification, down-conversion, and A/D conversion on each of the $M_r$ signals from the antenna array 815 to produce $M_r$ parallel OFDM symbol streams, and N receiver baseband processing modules 1220-$i$, each of which recovers transmitted bits from the corresponding user i (preferably including the CSI for the down-link 870-$i$) and preferably estimates the CSI for the corresponding up-link 880-$i$ from the $M_r$ parallel OFDM symbol streams.

Figure 13:
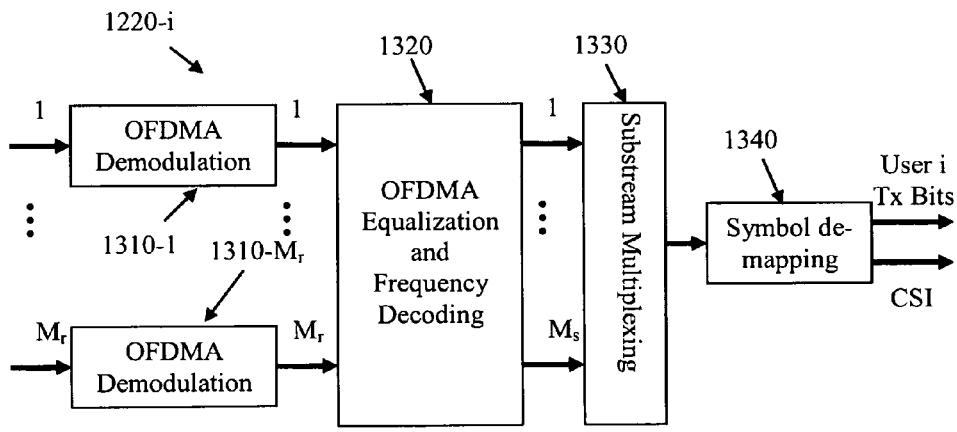
FIG. 13 illustrates each receiver baseband processing module of FIG. 12 in more detail.

FIG. 13 illustrates a receiver baseband processing module 1220-$i$, corresponding to user i, in more detail. The receiver baseband processing module 1220-$i$ comprises $M_r$ OFDMA demodulation modules 1310-1 to 1310-$M_r$, an OFDMA equalization and frequency decoding module 1320, a substream multiplexing module 1330, and a symbol de-mapping module 1340. Each OFDMA demodulation module 1310-$j$ converts a received OFDM symbol into frequency domain, and the OFDMA equalization and frequency decoding module 1320 removes the MIMO and frequency-selective multipath fading channel effects and recovers the data symbols into $M_s$ data substreams. Finally, after substream multiplexing by the module 1330, the $M_s$ data substreams form one stream of data symbols and are de-mapped into transmitted bits from the corresponding user i by the symbol de-mapping module 1340. The CSI for the down-link 870-$i$ to the corresponding user i is also preferably extracted by the symbol de-mapping module 1340 from the data bits, for use by the control module 1050 in the corresponding transmitter baseband processing module 910-$i$.

Figure 14:
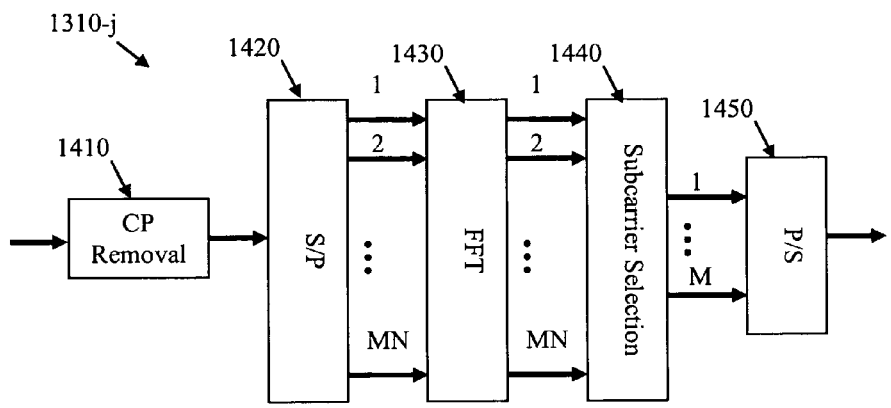
FIG. 14 illustrates each OFDMA demodulation module of FIG. 13 in more detail.

FIG. 14 illustrates each OFDMA demodulation module 1310-$j$ in more detail. The CP inserted by the module 1160 is firstly removed from the received OFDM symbol of the jth received signal by the CP removal module 1410. Then, the CP-removed OFDM symbol is converted into MN parallel time-domain samples by the S/P module 1420. After an FFT by the FFT module 1430, subcarrier selection (complementary to the subcarrier allocation carried out by the module 1130) is carried out by the module 1440 to select M data symbols in frequency domain for the corresponding user i. These data symbols are finally output in series via the P/S module 1450.

Figure 15:
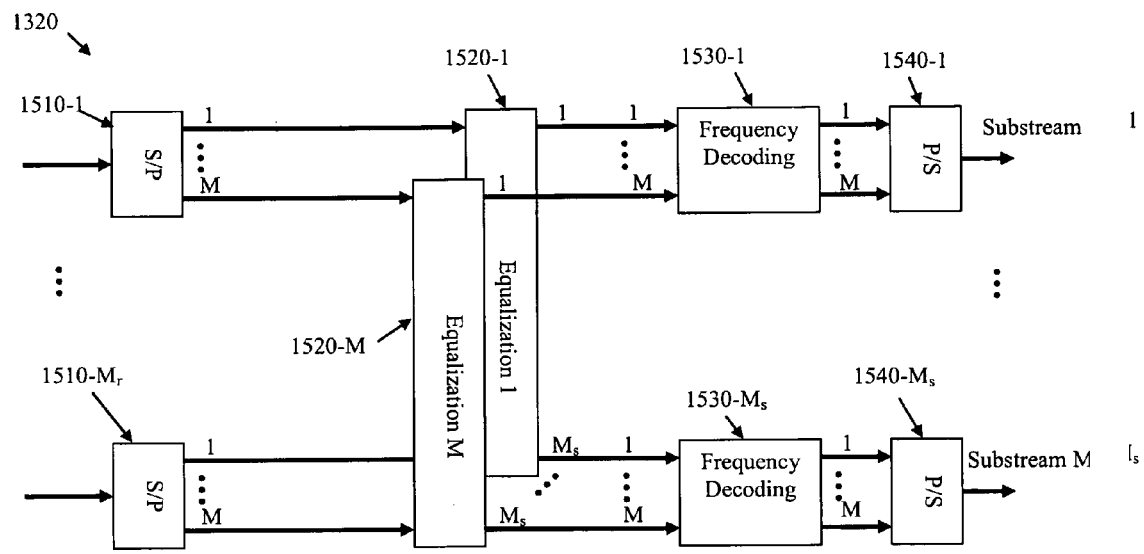
FIG. 15 illustrates the OFDMA equalization and frequency decoding module of FIG. 13 in more detail.

The OFDMA equalization and frequency decoding module 1320 is illustrated in more detail in FIG. 15. Each S/P module 1510 converts the demodulated data symbols from a corresponding OFDMA demodulation module 1310-$j$ into M parallel subchannels. Each set of $M_r$ data symbols from the M subchannels can be considered as a vector of dimension $M_r$ by 1. There are M such sets of $M_r$ symbols, and hence M vectors of dimension $M_r$ by 1. Each such vector is multiplied in an equalization module 1520-$k$ by a matrix of dimension $M_s$ by $M_r$ to form $M_s$ equalized data symbols. The equalization matrices depend on the space precoding matrix used in the module 1040, the channel characteristics, and the equalization technique to be used, as described above with reference to the module 430. There are M such equalization modules 1520-$k$, producing M sets of $M_s$ equalized data symbols. The M equalized data symbols from an equalized data symbol set are then passed through a frequency decoding module 1530-$k$ (implementing a matrix multiplication by a fixed M by M matrix) to produce M decoded data symbols, which form a single substream of decoded data symbols after a P/S module 1540-$k$. There are $M_s$ such substreams of decoded data symbols.

Figure 16:
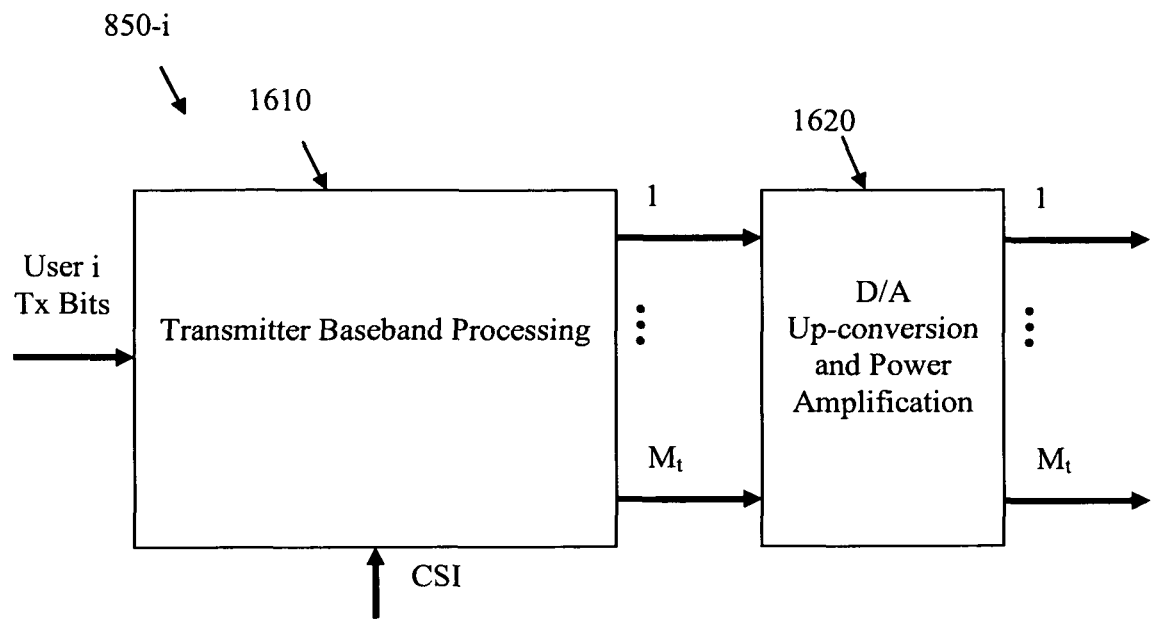
FIG. 16 illustrates the transmitter at the mobile station of FIG. 8 according to the second embodiment.

The transmitter 850-$i$ at the MS 820-$i$ according to the second embodiment is illustrated in FIG. 16. The transmitter 850 comprises one transmitter baseband processing module 1610, identical to a module 910-$i$ described above with reference to FIG. 10, which processes the transmitted bits from user i (preferably including the CSI for the down-link 870-$i$) to form $M_t$ signal streams. The $M_t$ signal streams are transmitted by the $M_t$ antennas in the array 825-$i$ after D/A conversion, up-conversion, and power amplification by module 1620, identical to module 930 described above.

Figure 17:
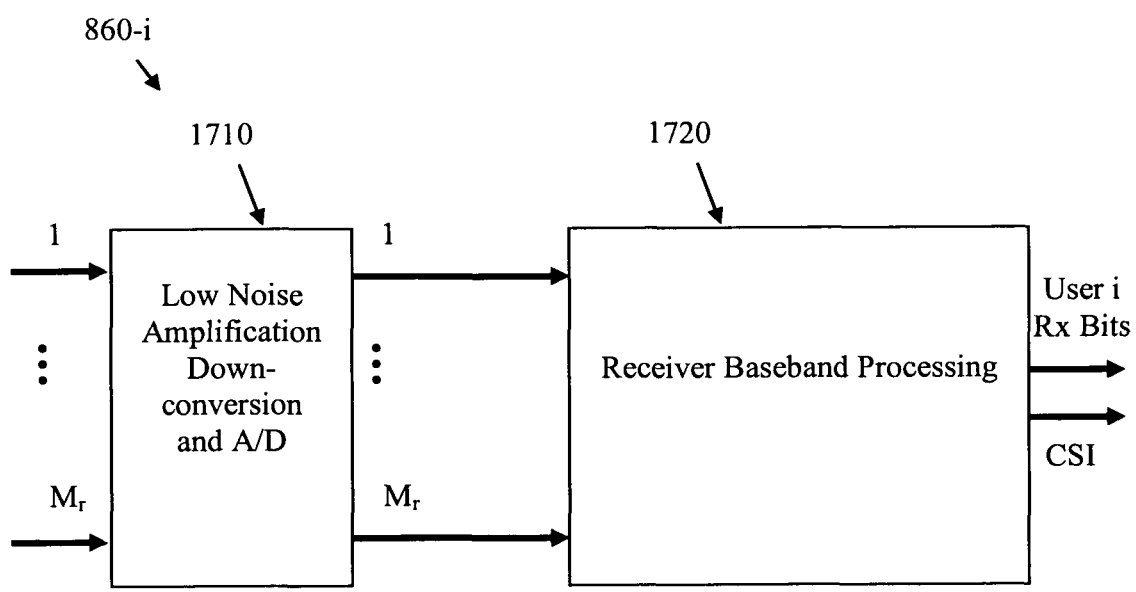
FIG. 17 illustrates the receiver at the mobile station of FIG. 8 according to the second embodiment.

The receiver 860-$i$ at the MS 820-$i$ according to the second embodiment is illustrated in FIG. 17. The receiver 860 comprises an RF module 1710, identical to the RF module 1210, performing low noise amplification, down-conversion, and A/D on each of the $M_r$ signals from the antenna array 825-$i$ to produce $M_r$ parallel OFDM symbol streams, and a receiver baseband processing module 1720, identical to a receiver baseband processing module 1220-$i$ described above with reference to FIG. 13, which recovers the bits to be received by user i (preferably including the CSI for the up-link 880-$i$) from the $M_r$ parallel OFDM symbol streams, and preferably estimates the CSI for the corresponding down-link 870-$i$.

The modules of FIGS. 1 to 17 may be implemented in dedicated hardware such as one or more integrated circuits performing the functions or sub functions of the corresponding module. Such dedicated hardware may include graphic processors, digital signal processors, or one or more microprocessors and associated memories.

It is apparent from the above that the arrangements described are applicable to the wireless communication industry.

The foregoing describes only some embodiments of the present invention, and modifications and/or changes can be made thereto without departing from the scope and spirit of the invention, the embodiments being illustrative and not restrictive.

The invention claimed is:

1. A method of processing a series of data bits for transmission on a transmit link, the method comprising:
    mapping said series of data bits to a series of data symbols;
    demultiplexing said series of data symbols to a plurality of substreams of symbols;
    frequency precoding each said substream of symbols;
    modulating each said frequency precoded substream of symbols to a corresponding series of OFDM symbols; and
    space precoding said plurality of series of OFDM symbols to form one or more series of space precoded OFDM symbols,
    wherein said demultiplexing is dependent on channel state information for said transmit link.

2. The method according to claim 1, further comprising transmitting each said series of space precoded OFDM symbols on a respective antenna.

3. The method according to claim 1, wherein said frequency precoding comprises, for each said substream of symbols:
    converting said substream of symbols to a plurality of groups of symbols;
    frequency precoding each said group of symbols; and
    interleaving said frequency precoded groups of symbols.

4. The method according to claim 1, wherein said mapping is dependent on said channel state information for said transmit link.

5. The method according to claim 1, further comprising receiving said channel state information for said transmit link over a feedback link.

6. The method according to claim 1, wherein said series of data bits includes channel state information for a feedback link.

7. The method according to claim 6, further comprising estimating said channel state information for said feedback link.

8. The method according to claim 1, wherein said demultiplexing comprises:
    choosing a number of substreams giving an optimal throughput for said channel state information; and
    demultiplexing said series of data symbols to said chosen number of substreams of symbols.

9. The method according to claim 4, wherein said mapping comprises
- choosing a modulation level giving an optimal throughput for said channel state information; and
- mapping said series of data bits to a series of data symbols using said chosen modulation level.

10. A method of processing one or more series of OFDM symbols, comprising:
- demodulating each said series of OFDM symbols to a corresponding series of space and frequency precoded data symbols;
- equalising said one or more series of space and frequency precoded data symbols to form one or more substreams of frequency precoded data symbols;
- frequency decoding each said substream of frequency precoded data symbols to a series of data symbols; and
- de-mapping said one or more series of data symbols to a series of data bits.

11. The method according to claim 10, further comprising receiving each said series of OFDM symbols from a corresponding antenna.

12. The method according to claim 10, further comprising estimating channel state information for a transmit link.

13. The method according to claim 12, further comprising transmitting said channel state information for said transmit link over a feedback link.

14. A processing device, comprising:
- a symbol mapping module adapted to map a series of data bits to a series of data symbols;
- a demultiplexing module adapted to demultiplex said series of data symbols to a plurality of substreams of symbols;
- one or more frequency precoding modules adapted to frequency precode said substreams of symbols into one or more frequency precoded substreams of symbols;
- one or more modulation modules, each adapted to modulate one said frequency precoded substream of symbols to a corresponding series of OFDM symbols; and
- a space precoding module adapted to space precode said plurality of series of OFDM symbols to form one or more series of space precoded OFDM symbols,
- wherein said demultiplexing module receives channel state information for a transmit link.

15. A processing device, comprising:
- one or more demodulation modules, each adapted to demodulate a series of OFDM symbols to a corresponding series of space and frequency precoded data symbols;
- an equalisation module adapted to equalise said one or more series of space and frequency precoded data symbols to form one or more substreams of frequency precoded data symbols;
- one or more frequency decoding modules, each adapted to frequency decode one said substream of frequency precoded data symbols to a series of data symbols;
- a de-mapping module adapted to de-map said one or more series of data symbols to a series of data bits.

\* \* \* \* \*